United States Patent [19]

Brueck et al.

[11] Patent Number: 5,239,407
[45] Date of Patent: Aug. 24, 1993

[54] METHOD AND APPARATUS FOR CREATING LARGE SECOND-ORDER NONLINEARITIES IN FUSED SILICA

[75] Inventors: S. R. J. Brueck; Richard A. Myers; Anadi Mukerjee; Adam Wu, all of Albuquerque, N. Mex.

[73] Assignee: University of New Mexico, Albuquerque, N. Mex.

[21] Appl. No.: 767,298

[22] Filed: Sep. 27, 1991

[51] Int. Cl.$^5$ .............................................. G02F 1/37
[52] U.S. Cl. .................................. 359/326; 385/122; 385/141
[58] Field of Search .................. 359/326–332; 385/122, 123, 129, 130, 141, 142, 144; 430/269

[56] References Cited

U.S. PATENT DOCUMENTS 4,255,017  3/1981  Hasegawa ..................... 359/332 X

OTHER PUBLICATIONS

"Determination of the Nonlinear Optical Susceptibility $\chi^2$ of Surface Layers by Sum and Differences Frequency Generation in Reflection and Transmission" by Dick et al. Appl. Phys. B38 107–116 (1985).

"Large Second-order nonlinearity in poled fused silica" by Myers, Optics Letters/vol. 16, No. 22, Nov. 15, 1991.

Österberg, U. & Margulis, W. Opt. Lett. 11 516 (Aug. 1986).

Stolen, R. H.; Tom, H. W. K, Opt. Lett. 12, 585 (Aug. 1987).

Anderson, D. Z.; Mizrahi V; Sipe J. E.; Opt. Lett. 16, 796 (Jun. 1991).

Kamal, A et al. Digest of Optical Society of America Annual Meeting, Optical Society of America Washington, D.C. Nov. 1990 paper PD25.

Mukherjee A.; Brueck, S. R. J.; Wu, A. Y. Opt. Commun. 76, 220 (May 1990).

Carvalho, I. C. S. et al. "Proc. of the 1991 Conference on Lasers and Electrooptics" Optical Society of America Washington D.C., May 1991 Paper JTuA3.

Primary Examiner—Akm E. Ullah
Attorney, Agent, or Firm—Albert Sopp

[57] ABSTRACT

A large second-order nonlinearity ($\chi^{(2)} \sim 1$ pm/V $\sim 0.2$ $\chi^{(2)}_{22}$ of LiNbO$_3$) is induced in the near surface ($\sim 4$ $\mu$m) region of commercial fused silica optical flats by a temperature (250°–325° C.) and electric field (E $\sim 5 \times 10^4$ V/cm) poling process. Once formed, the nonlinearity is roughly $10^3$–$10^4$ larger than that found in fiber second-harmonic experiments and is very stable at room temperature and laboratory ambient. The nonlinearity can be cycled by repeated depoling (temperature only) and repoling (temperature and electric field) processes.

19 Claims, 2 Drawing Sheets

METHOD AND APPARATUS FOR CREATING LARGE SECOND-ORDER NONLINEARITIES IN FUSED SILICA

This invention was made in the performance of work under a contract with the United States Department of the Air Force, and the United States Government has certain rights therein.

BACKGROUND OF THE INVENTION

Linear electrooptic switching and second-harmonic generation are processes that require materials possessing second-order nonlinear susceptibilities. That is, materials for which the polarization of the material has a term that responds to the square of the electric field. For optical switching, an applied DC or low frequency field can then modulate the material response to an optical field leading to optical switching. In second harmonic generation, the polarization at the second harmonic is proportional to the square of the applied optical field at the fundamental (first harmonic) frequency. It has long been known that for materials with inversion symmetry, i.e. materials that cannot in some way distinguish between up and down, the second-order susceptibility must vanish. Even though materials such as silica ($SiO_2$) may have a crystal structure without inversion symmetry, the random orientations found in amorphous or glassy forms of the material ensures a macroscopic inversion symmetry.

There are myriad applications for materials with second-order nonlinearities, particularly in integrated optics and optoelectronics. For example, $LiNbO_3$ waveguide switches for optical crossbar applications are commercially available. As optoelectronics matures with widespread applications in optical information processing, there is a growing need for the development of improved high-speed waveguide switches, directional couplers, and other signal routing devices. Compatibility with semiconductor optoelectronics will lead to a major simplification and growth of the market for these devices. $LiNbO_3$ switches are based on a bulk crystal technology, which is not directly compatible with semiconductors such as Si and GaAs or other III-V compounds that are widely used for the fabrication of laser sources and detectors in optoelectronics.

There is also increasing interest in harmonic generation in waveguides, particularly to convert the infrared output of III-V semiconductor lasers to the visible. Here again compatibility with traditional semiconductor materials is a major issue. Present techniques rely principally on external harmonic generation, usually involving resonant cavity effects, with relatively complex optical and mechanical arrangements.

Fused silica is ubiquitous in modern technology. Its extremely low linear optical losses have enabled the fiber optics industry. $SiO_2$ also plays a dominant role in microelectronics technology where the unique properties of the $Si$-$SiO_2$ interface are largely responsible for the behavior of metal-oxide semiconductor (MOS) devices underlying advances in computer hardware.

Unlike its related quartz crystalline phase, fused silica is amorphous with a macroscopic inversion symmetry that forbids second-order nonlinear processes. Thus, the discovery by U. Österberg and W. Margulis, Opt. Lett. 11, 516 (1986) of efficient second harmonic generation (SHG) in a variety of Si-Ge glass fibers upon "training" with optical fields has generated considerable interest in the physics and applications of this unexpected phenomenon. R. H. Stolen and H. W. K. Tom, Opt. Lett. 12, 587 (1987) showed that the nonlinearity could be induced in a much shorter time by seeding the fiber simultaneously with both the fundamental optical (1.06 $\mu$m) and the second harmonic (532 nm) beams and proposed a mechanism based on static electric-field-induced nonlinearities. The field arises from charge separation and trapping in the fiber material. Recently, D. Z. Anderson, V. Mizrahi and J. E. Sipe, Opt. Lett. 16, 796 (1991) have proposed a photovoltaic effect based on interference between the fundamental and harmonic fields that phenomenologically accounts for the observed strength of this field, which (see A. Kamal, M. L. Stock, A. Szpak, C. H. Thomas, D. A. Weinberger, M. Frankel, J. Nees, K. Ozaki, and J. Valdmanis, in *Digest of Optical Society of America Annual Meeting* (Optical Society of America, Washington, D.C., (1990) paper PD25) is about four orders of magnitude larger than the field expected from optical rectification. This field interacts with the material third-order nonlinearity, $\chi^{(3)}$, to provide an effective $\chi^{(2)} = \chi^{(3)} E_{dc}$. Similar field-induced nonlinearities have been observed in a variety of material systems, e.g. paraelectric PLZT by A. Mukherjee, S. R. J. Brueck and A. Y. Wu, Opt. Commun. 76, 220 (1990). An alternative explanation is an orientation of nonlinear moieties in the glass, although no microscopic identification of these moieties or of the magnitude of their nonlinearities has been put forward.

SUMMARY OF THE INVENTION

According to the invention, a permanent second-order nonlinearity $\chi^{(2)}$ in the near surface region of bulk fused $SiO_2$ is induced by a temperature/static electric-field poling process. The induced $\chi^{(2)}$s achieved are three to four orders of magnitude larger than those found in the fiber experiments (as mentioned in the above-cited Österberg article) and approach that of traditional nonlinear optical materials such as $LiNbO_3$.

BRIEF DESCRIPTION OF THE DRAWINGS

Reference is now made to the drawings in which.

DETAILED DESCRIPTION OF THE INVENTION

Figure 1:
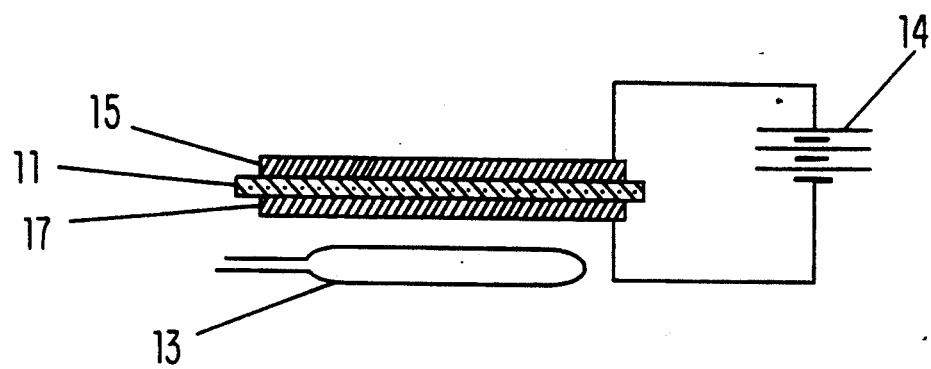
FIG. 1. is a schematic diagram of an arrangement in accordance with the invention for producing a permanent second-order nonlinearity $\chi^{(2)}$ in bulk fused $SiO_2$.

In accordance with the invention, referring to FIG. 1, $\chi^{(2)}$ nonlinearity is produced in a sample 11 of fused $SiO_2$ (silica) 1-mm thick by first heating it from source 13 to temperature in the range of about 200° C. to about 325° C. in a laboratory ambient while applying from source 14 a dc bias of from about 3 kV to about 4 kV to electrodes 15 and 17 on opposite sides of the $SiO_2$ sample. After 10 to 15 minutes of poling, the heater is turned off and the sample cooled to room temperature while maintaining the dc field. The electrodes 15 and 17 which may be stainless steel and/or Si may be in intimate or close contact with the sample 11. Other electrode materials such as evaporated Au or Ag may be used. Once cooled, the electric field is removed and a stable $\chi^{(2)}$ nonlinearity is observed. Samples maintained at room temperature without special precautions for several months maintain the nonlinearity without significant degradation. Application of heat alone, above about 200° C. for a duration that varies with the temperature, removes the nonlinearity. While the voltage to be used is not proportional to the sample thickness, nonlinearities are obtained when 180-$\mu$m thick samples are placed atop a 1-mm thick sample and the above-mentioned voltage of about 5 kV is applied across both samples.

During the poling, the current decays in about two to three minutes. The maximum current varies from 0.8 $\mu$A to 5 $\mu$A; no correlation has been established as yet between this current and the sample properties. However, the integrated current is roughly constant for all samples.

The second-order nonlinearity of these poled samples may be observed under irradiation with 10-ns laser pulses at the fundamental wavelength of 1.06 $\mu$m from an unfocussed (1-mm spot size) Q-Switched Nd-YAG laser beam operating at 10 Hz at an intensity of 10 MW/cm$^2$. Under these conditions, a strong second harmonic wave is produced. For example, such wave as recorded with a photomultiplier tube has an observed signal-to-noise ratio of approximately 104:1.

Since the poling breaks the symmetry along the electric field direction, the effective c-axis of the nonlinearity is along this direction, and a second harmonic (SH) polarization may be induced only along this direction. Orienting the z-axis (i.e., the "3" direction) of a three-dimensional Cartesian coordinate system along the c-axis of the poled sample, the induced SH polarization can be written as:

$$p2\omega_z = 2\epsilon_0 \{\chi^{(2)}{}_{31}(E_x{}^2 + E_y{}^2) + \chi^{(2)}{}_{33}E_z{}^2\} \quad (1)$$

where $\epsilon_o$ is the dielectric constant, $E_x$, $E_y$, and $E_z$ are the electric fields in the direction of the x,y, and z axes, and $\chi^{(2)}{}_{31}$ and $\chi^{(2)}{}_{33}$ are the appropriate tensor elements of the second-order nonlinear susceptibility. Defining the plane containing the propagation vector of the pump beam and the surface normal as the horizontal plane, and, and propagating the p-polarized input beam at an angle $\theta$ with respect to the c-axis, the induced SH polarization $p$ can be written as:

$$p = 2\epsilon_o E_1{}^2(\chi^{(2)}{}_{31}\cos{}^2\theta \sin\theta + \chi^{(2)}{}_{33}\sin{}^3\theta) \quad (2)$$

Figure 2:
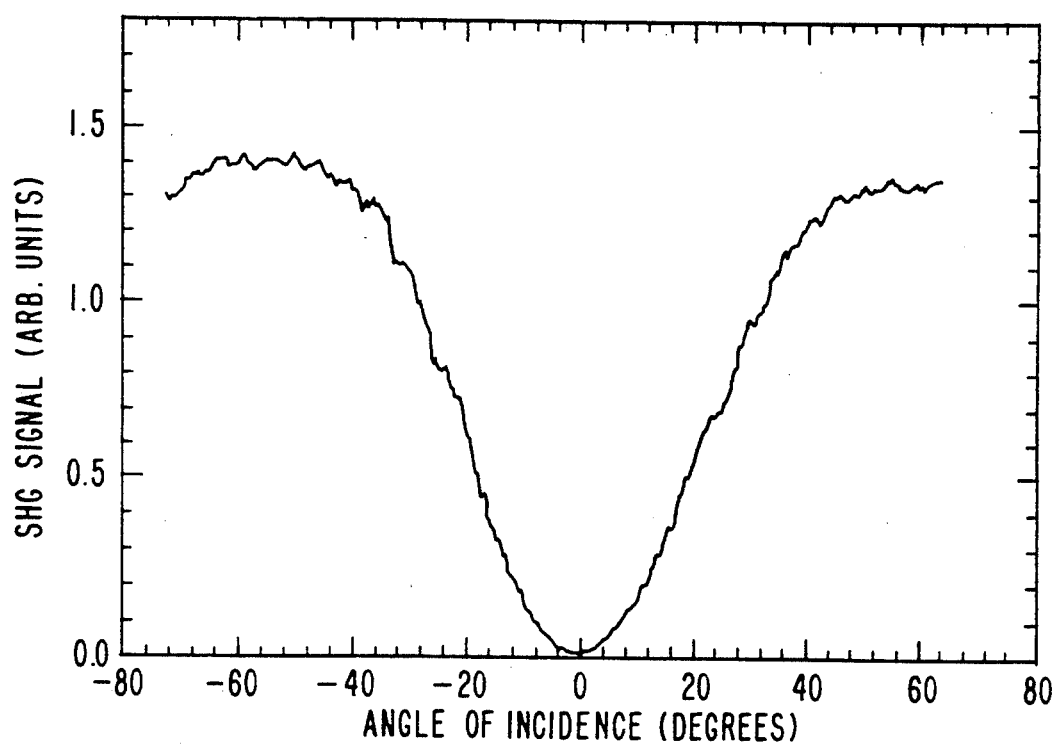
FIG. 2 is a graph of SHG signal at 533 nm from a poled optosil TM sample vs. the angle of incidence for a TM polarized fundamental beam at 1.06 $\mu$m.

The observed power of the SHG wave is $P^{2\omega} \propto |p|^2 \cos^2\theta$ where the $\cos^2\theta$ factor comes from the increase of the beam cross-sectional area (and decrease in intensity) with increasing angle. There is no SHG wave for normal incidence irradiation. A theoretical fit to the angular dependence of the SHG power shows that the SHG wave should maximize at an incident angle of approximately 60°. As shown in FIG. 2, a large second harmonic wave was measured at 60° angle between the propagation vector of the incident light and the surface normal.

Figure 3:
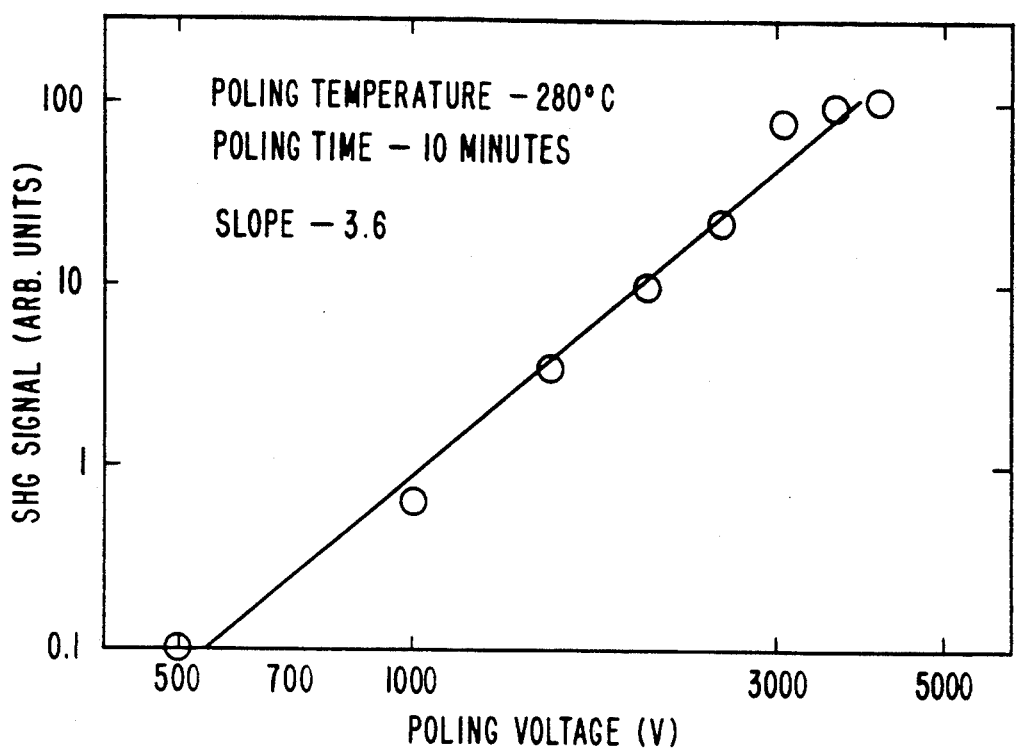
FIG. 3 is a graph of SHG signal vs. the poling voltage for a fixed temperature and poling time. The signal was obtained on a single sample with successive polings at higher poling voltages.

Scanning the laser spot transversely across the sample yields a smooth nonlinearity profile over the area covered by the 1-cm$^2$ electrode used for poling. As shown in FIG. 3, the SHG wave increases as a ~3.2-3.5 power law with the applied voltage for fixed poling temperatures and times. Heating to about 200° C. erases the nonlinearity. The nonlinearity may be recycled through a number of cycles of depoling (by application of heat alone) and repoling (by application of heat and electric field) without degradation of the wave. CW irradiation at a power level of 100 mW/cm$^2$ at 257 nm for over an hour does not effect the nonlinearity. This is in contrast to the fiber results, where uv irradiation does erase the nonlinearity as shown by I. C. S. Carvalho, P. M. P. Gouvea, W. Margulis, J. P. vod der Weid, and B. Lesche, Proc. of the 1991 Conference on Lasers and Electrooptics (Optical Society of America, Washington, D.C., 1991, paper JTuA3)

Regarding SHG waves at other wavelengths, 8-10 ns pulses of 0.1 mJ energy at the wavelengths of 532 nm and 750 nm are obtained from a frequency doubled Q-switched YAG laser and a pulsed dye laser pumped by the frequency doubled YAG laser, repectively. These pulses are used to generate SHG waves at 266 nm and at 375 nm, respectively.

No fringes occur as the angle of incidence is varied at any wavelength. This indicates that the nonlinear layer thickness is less than or comparable to the coherence length, which is 3 $\mu$m at 532 nm as shown by I. H. Malitson, J. Opt. Soc. Amer. 55, 1205 (1965). The absence of fringes also indicates that the nonlinearity is generated only on one side of the sample. From the periodicity of the interference fringes observed from two adjacent samples, it is seen that the nonlinearity is always on the positive-biased side of the sample. The nonlinearity moves from one side to the other under repoling with reversed polarity.

Figure 4:
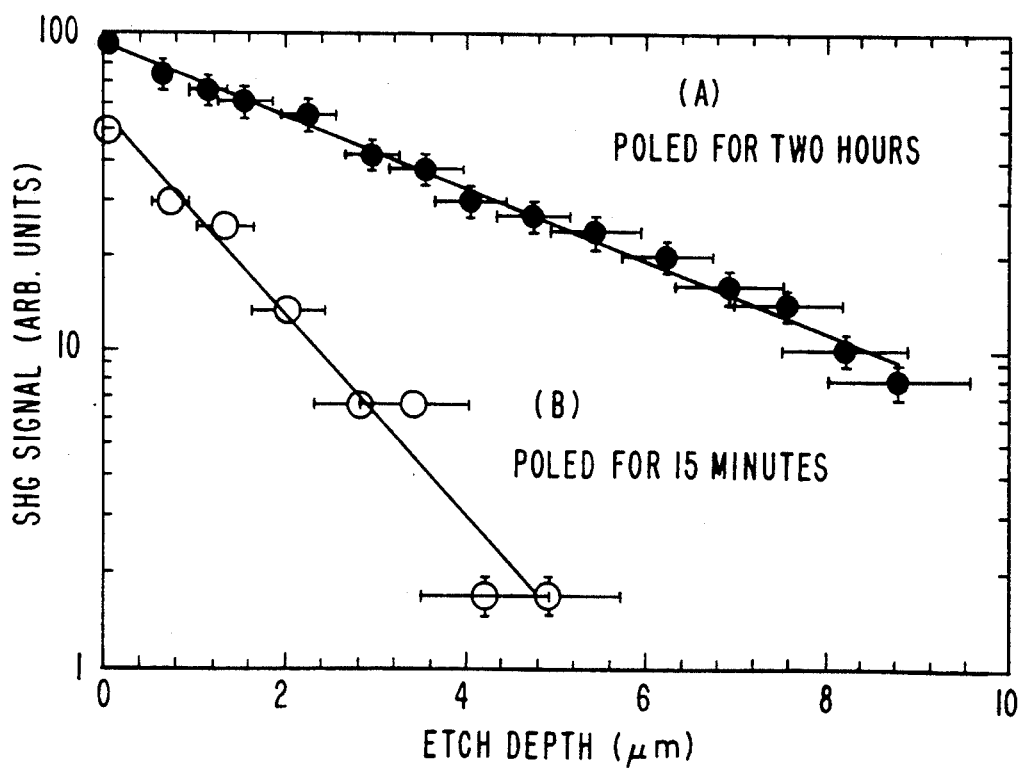
FIG. 4 is a graph of SHG signal as material is successively etched away for two samples with identical poling voltages (5 kV) and temperatures (280° C.) but different poling times.

The depth profile of the nonlinearity is determined by differential chemical etching using 49% HF acid solution. FIG. 4. shows the variation of the SHG as a function of the layer depth for samples poled for a duration of 15 minutes and for a duration of two hours. Etch depths are determined by surface profilometer scans at each etch step. There is significant roughening of the sample surface by the etching. An index matching fluid is used to insure an optically smooth surface for comparability of the results. While the initial SHG signal measured using 1.06-$\mu$m pulses is approximately the same for both samples, the increase of the layer thickness on longer poling time is significant. For the nominal 15 min. poling, the characteristic depth of layer thickness is $\leq$4 $\mu$m.

The $\chi^{(2)}$ coefficient can be measured by comparing the signal from poled SiO$_2$ samples with the SHG signal generated in crystal quartz (1-mm thick) and LiNbO$_3$ (76-$\mu$m thick) reference samples at four different wavelengths. The maximum SHG signal in these reference samples, generated over a full coherence length (much shorter than these sample lengths) is given by $$P^{2\omega}{}_{max} \propto |p|^2 \cos{}^2\theta L_c{}^2/\pi^2 \quad (3)$$

where $L_c (=\pi/\Delta k)$ is the coherence length for the SHG at the corresponding wavelength. For an exponentially decaying nonlinearity, as found for the poled fused silica samples, the SHG power is $$P2\omega(L) \propto |p(0)|^2 \{(e^{-2\alpha L} + 1 - 2e^{-2\alpha L}\cos \Delta k L)/(\Delta k^2 + \alpha^2)\} \quad (4)$$

where $\alpha^{-1}$ is the characteristic length of the nonlinearity. For an exponentially decaying nonlinearity, the limit of $L \to \infty$ can be used and the SHG power becomes proportional to $P^{2\omega} \to |\rho(0)|^2 \{\Delta k^2 + \alpha^2\}^{-1}$. From the observed etching rate, the inverse characteristic length of the nonlinearity is measured. The strength of the nonlinearity is estimated from this series of measurements as $\chi^{(2)} \sim 1 \times 10^{-12}$ m/V.

It will be appreciated that in accordance with the present invention there has been provided a very large second-order nonlinearity in the near surface regions of bulk fused silica. The $\chi^{(2)}$ coefficient is three orders of magnitude larger than that reported for fibers. The $\chi^{(2)}$ value of $1 \times 10^{-12}$ m/V is of the same order as crystal quartz.

One possibility for the microscopic mechanism of this nonlinearity involves the creation and orientation of $AlO_{3/2}^- -Na^+$ or other nonlinear complexes during the poling process. However, this model leads to questionably large values for the hyperpolarizability (i.e., the molecular nonlinearity). Another possibility is the generation of a large dc field ($\sim 10^6$-$10^7$ V/cm) by charge transport under the poling conditions. This large field then interacts with the third-order susceptibility of the quartz to produce an effective second-order nonlinearity. Most likely, the mobile charge carriers in this temperature range are alkali ions such as $Na^+$.

Because of the ready manufacturability of silica optical materials and their integration with semiconductor optoelectronics, this nonlinearity has important applications in waveguide and other optoelectronic devices.

What is claimed is:

1. A body of amorphous silica having a second-order electromagnetic nonlinearity in its near surface portion.

2. The body of claim 1 wherein the nonzero tensor components of the second-order nonlinear susceptibility are the $\chi^{(2)}_{33}$ and $\chi^{(2)}_{31}$ components with the "3" direction corresponding with the normal to the surface of said body.

3. The body of claim 2 wherein the body is an optical flat.

4. The body of claim 1 wherein the second-order nonlinearity is characterized by a tensor with components such that the maximum power in the second harmonic generated wave occurs when the impinging radiation has a predetermined angle of incidence.

5. The body of claim 1 wherein said body is a slab approximately 0.2 to 2 mm thick.

6. The method of producing in a body of amorphous silica a surface portion having a second-order electromagnetic nonlinearity comprising the steps of:
   a) heating the body to a temperature range the lowest temperature of which is approximately 200° C.;
   b) applying a dc bias directly across said body;
   c) cooling said body while maintaining said bias until said body reaches approximately room temperature.

7. The method of claim 6 wherein said body is essentially a slab approximately 0.2 to 2 mm thick.

8. The method of claim 6 wherein said body is an optical flat.

9. The method of claim 6 wherein steps a) and b) are performed essentially concurrently.

10. The method of claim 6 wherein the temperature range is from approximately 200° C. to about 325° C.

11. The method of claim 9 wherein steps a) and b) are conducted over a period of at least about 10 minutes.

12. The body of claim 1 wherein said amorphous silica is of purity approximately that of commercial grade silica.

13. A body of amorphous silica having a second-order electromagnetic non-linearity in its surface portion, said body being a slab approximately 0.2 to 2 mm thick.

14. A body of amorphous silica having a second-order electromagnetic nonlinearity in its surface portion produced by heating the body to a temperature of at least approximately 200° C., applying a dc bias thereto, and cooling said body to room temperature while maintaining said bias thereon.

15. The body of claim 14 wherein the nonzero tensor components of the second-order nonlinear susceptibility are the $\chi^{(2)}_{33}$ and $\chi^{(2)}_{31}$ components with the "3" direction corresponding with the normal to the surface of said body.

16. The body of claim 14 wherein said body is an optical flat.

17. The body of claim 14 wherein the second-order nonlinearity is characterized by a tensor with components such that the maximum power in the second harmonic generated wave occurs when the impinging radiation has a predetermined angle of incidence.

18. The body of claim 14 wherein said body is a slab approximately 0.2 to 2 mm thick.

19. The body of claim 14 wherein said body of amorphous silica has a purity approximately that of commercial grade silica.

* * * * *